United States Patent
Li et al.

(10) Patent No.: US 11,532,182 B2
(45) Date of Patent: Dec. 20, 2022

(54) AUTHENTICATION OF RGB VIDEO BASED ON INFRARED AND DEPTH SENSING

(71) Applicant: Lenovo (Singapore) Pte. Ltd., Singapore (SG)

(72) Inventors: Scott Wentao Li, Cary, NC (US); Igor Stolbikov, Apex, NC (US); Alfredo Zugasti, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 64 days.

(21) Appl. No.: 17/192,566

(22) Filed: Mar. 4, 2021

(65) Prior Publication Data

US 2022/0284228 A1 Sep. 8, 2022

(51) Int. Cl.
| | |
|---|---|
| *G06V 40/40* | (2022.01) |
| *G06T 7/50* | (2017.01) |
| *H04N 7/15* | (2006.01) |
| *H04N 5/33* | (2006.01) |
| *G06V 10/75* | (2022.01) |
| *G06V 20/40* | (2022.01) |

(52) U.S. Cl.
CPC ............ *G06V 40/40* (2022.01); *G06T 7/50* (2017.01); *G06V 10/751* (2022.01); *G06V 20/48* (2022.01); *H04N 5/33* (2013.01); *H04N 7/15* (2013.01); *G06T 2207/10016* (2013.01); *G06T 2207/10024* (2013.01); *G06T 2207/10048* (2013.01)

(58) Field of Classification Search
CPC combination set(s) only.
See application file for complete search history.

(56) References Cited

U.S. PATENT DOCUMENTS

| | | | |
|---|---|---|---|
| 2016/0353058 A1* | 12/2016 | Caviedes | H04N 7/15 |
| 2018/0096196 A1* | 4/2018 | Gordon | G06F 21/316 |
| 2018/0262714 A1* | 9/2018 | Kim | G06F 3/0488 |
| 2019/0311496 A1* | 10/2019 | Bloom | G06T 7/521 |
| 2019/0347823 A1* | 11/2019 | Yang | G06T 7/73 |
| 2021/0209388 A1* | 7/2021 | Ciftci | G06V 40/45 |

\* cited by examiner

*Primary Examiner* — Phung-Hoang J Nguyen
(74) *Attorney, Agent, or Firm* — John M. Rogitz; John L. Rogitz (57) ABSTRACT

In one aspect, a device may include at least one processor and storage accessible to the at least one processor. The storage may include instructions executable by the at least one processor to access a first frame of RGB video content corresponding to a first time, access a first frame of IR video content corresponding to the first time, and access data from a depth sensor corresponding to the first time. The instructions may also be executable to determine whether at least a portion of the first frame of the RGB video content correlates to at least a portion of the first frame of the IR video content and/or the data from the depth sensor. Responsive to a determination that it does, the instructions may be executable to authenticate the RGB video content and indicate the RGB video content as being authenticated via a graphical user interface.

20 Claims, 6 Drawing Sheets

AUTHENTICATION OF RGB VIDEO BASED ON INFRARED AND DEPTH SENSING

FIELD

The disclosure below relates to technically inventive, non-routine solutions that are necessarily rooted in computer technology and that produce concrete technical improvements. In particular, the disclosure below relates to techniques for authentication of red green blue (RGB) video based on infrared and depth sensing.

BACKGROUND

As recognized herein, so-called "deep fake" technology uses artificial intelligence (AI) to generate real-looking but fictional digital videos that show a certain real-life person as apparently saying things that the person never in fact said. If that were not bad enough, the present disclosure recognizes that the consequences of being duped by a deep fake are particularly acute in video conference settings where, owing to the remote nature of the video conference, a certain person's likeness may be spoofed in real-time without others knowing. This in turn can lead to the disclosure of private, sensitive, and/or confidential information to the unauthorized party doing the spoofing. This can also lead to the person's likeness being abused to convey unauthorize instructions and other information that can have a devastating impact on the person's personal and professional life. Verbal abuse of other video conference participants can also occur. The present disclosure recognizes that there are currently no adequate solutions to the foregoing computer-related, technological problem.

SUMMARY

Accordingly, in one aspect a first device includes at least one processor and storage accessible to the at least one processor. The storage includes instructions executable by the at least one processor to access a first frame of red green blue (RGB) video content, where the first frame of the RGB video content corresponds to a first time. The instructions are also executable to access a first frame of infrared (IR) video content, where the first frame of the IR video content corresponds to the first time. The instructions are further executable to access data from a depth sensor, where the data corresponds to the first time. The instructions are then executable to compare the first frame of the RGB video content to one or more of the first frame of the IR video content and the data from the depth sensor to determine whether a match can be identified at least to within a threshold level of confidence. Responsive to a determination that a match has been identified at least to within the threshold level of confidence, the instructions are executable to authenticate the RGB video content for at least a first amount of time and indicate the RGB video content as being authenticated via a graphical user interface (GUI) presented on a display.

In some example implementations, the instructions may be executable to access the first frame of the IR video content and the data from the depth sensor via a side channel different from another channel through which the RGB video content is being communicated to the first device.

Also in some example implementations, the instructions may be executable to compare the first frame of the RGB video content to both the first image of the IR video content and the data from the depth sensor to determine whether a match can be identified at least to within the threshold level of confidence using the first frame of the RGB video content, the first frame of the IR video content, and the data from the depth sensor. Thus, responsive to a determination that a match has been identified at least to within the threshold level of confidence at least using the first frame of the RGB video content, the first frame of the IR video content, and the data from the depth sensor, the instructions may be executable to authenticate the RGB video content for at least the first amount of time and indicate the RGB video content as being authenticated via the GUI presented on the display.

Still further, in some example embodiments the match may relate to the matching of one or more boundaries indicated in the first images and data. Also in some example embodiments, the match may relate to matching features of the face of a person indicated in the first frame of the RGB video content and indicated in the data from the depth sensor and/or the first frame of the IR video content.

If desired, the first amount of time may be no more than one second. Also if desired, the threshold level of confidence may be at least ninety percent or above.

In various example embodiments, the depth sensor may include a time-of-flight depth sensor such as a laser rangefinder or an IR rangefinder. Additionally, in some examples the first device may include the depth sensor and an IR camera that generates the IR video content.

Still further, in some example embodiments the first device may include a server that facilitates a video conference, and the RGB video content may indicate a participant of the video conference. In these embodiments, the server may receive, from a second device different from the first device, the first frame of the RGB video content, the first frame of the IR video content, and the data from the depth sensor.

In another aspect, a computer-implemented method includes accessing, at a first device, a first frame of red green blue (RGB) video content, with the first frame of the RGB video content corresponding to a first time. The method also includes accessing, at the first device, a first frame of infrared (IR) video content, with the first frame of the IR video content corresponding to the first time. The method further includes accessing, at the first device, data from a depth sensor, with the data corresponding to the first time. The method then includes determining, using the first device, whether a match can be identified at least to within a threshold level of confidence based on the first frame of the RGB video content and one or more of the first frame of the IR video content and the data from the depth sensor. The method then includes using the first device to authenticate the RGB video content for at least a first amount of time responsive to determining that a match has been identified at least to within the threshold level of confidence.

In some examples, the method may further include indicating, using the first device, the RGB video content as being authenticated via a graphical user interface (GUI).

Also in some examples, the method may include determining, using the first device, whether a match can be identified at least to within the threshold level of confidence based on comparing the first frame of the RGB video content to one or more of the first frame of the IR video content and the data from the depth sensor.

Additionally, in some example implementations the method may include determining, using the first device, whether a match can be identified at least to within the threshold level of confidence based on the first frame of the RGB video content and both of the first frame of the IR video content and the data from the depth sensor.

Still further, if desired the method may include identifying an indicator in at least one IR image frame prior to authenticating the RGB video content and, responsive to identifying the indicator and responsive to determining that a match has been identified at least to within the threshold level of confidence, using the first device to authenticate the RGB video content for at least the first amount of time. The indicator may be encrypted and/or the indicator may denote that the IR image frame is not fake.

In still another aspect, at least one computer readable storage medium (CRSM) that is not a transitory signal includes instructions executable by at least one processor to access a first frame of red green blue (RGB) video content, with the first frame of the RGB video content corresponding to a first time. The instructions are also executable to access a first frame of infrared (IR) video content, with the first frame of the IR video content corresponding to the first time. The instructions are further executable to access data from a depth sensor, with the data corresponding to the first time. The instructions are then executable to determine whether at least a portion of the first frame of the RGB video content correlates, at least within a threshold level of confidence, to at least a portion of one or more of the first frame of the IR video content and the data from the depth sensor. The instructions are then executable to authenticate the RGB video content and indicate the RGB video content as being authenticated via a graphical user interface (GUI) presented on a display. The RGB video content is authenticated responsive to a determination that at least a portion of the first frame of the RGB video content correlates, at least within the threshold level of confidence, to at least a portion of one or more of the first frame of the IR video content and the data from the depth sensor.

In some example implementations, the instructions may be executable to, prior to authenticating the RGB video content, identify an indicator in at least one IR image frame. The indicator may denote that the IR image frame is not a deep fake. In these implementations, the instructions may then be executable to authenticate the RGB video content responsive to identifying the indicator.

The details of present principles, both as to their structure and operation, can best be understood in reference to the accompanying drawings, in which like reference numerals refer to like parts, and in which:

DETAILED DESCRIPTION

Among other things, the disclosure below relates to use of depth field and infrared (IR) data streams in a side channel to authenticate red green blue (RGB) video during video-based conferencing. Thus, authentication of scenery in RGB video frames may be performed where, for example, an RGB camera video frame is captured and compared to a captured IR video frame from the same device and a captured depth sensor video frame from the same device. Those three frames may have a relatively high correlation (e.g., close to one-to-one) in order to achieve a threshold set for source authenticity. If small lags exist between the image frames as provided by the respective sensor sources, the lag may be known and offset if desired.

Additionally, if desired the host device may issue challenges in the IR channel to the IR illuminator/laser on the other device to flash certain pattern or entropy (e.g., encrypted pattern). Then if the host fails to detect the correct answer in the infrared frame source, the associated RGB video source may be deemed as un-authenticated. Thus, in using an IR illuminator strobe to produce a certain pattern/entropy, the pattern or entropy may not be detectable by the naked eye but an IR sensor may still detect/discern the pattern and/or video frame entropy.

Thus, the remote device may relatively easily stream out highly-correlated RBG, IR and depth frames at, e.g., 30 frames per second, but it would still be very computationally intensive for deep fake AI to generate something similar in a correlated manner in real time. Adding an IR side channel challenge via an IR illuminator strobe or pattern would make it even more computationally intensive or even impossible to generate something similar in a correlated manner in real time.

Accordingly, in one example process flow that may be executed, a host device may issue a challenge requesting RGB, IR, and depth video frames from another device. The challenged device may then answer the challenge by providing the requested RGB, IR, depth frames to the host device. The host device may then determine whether a correlation exists between the frames and, if highly correlated such as close to one-to-one, then the challenged device and/or its RGB video may be authenticated. If desired, the host device can also issue an additional challenge asking the challenged device to strobe its illuminator, and the challenged device may answer the challenge by providing a correct IR source frame. If the strobe's entropy is a match or match to a threshold level of confidence, then challenged device/video source may be authenticated.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to hypertext markup language (HTML)-5, Java/JavaScript, C# or C++, and can be stored on or transmitted from a computer-readable storage medium such as a random access memory (RAM), read-only memory (ROM), electrically erasable programmable read-only memory (EEPROM), a hard disk drive or solid state drive, compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

Figure 1:
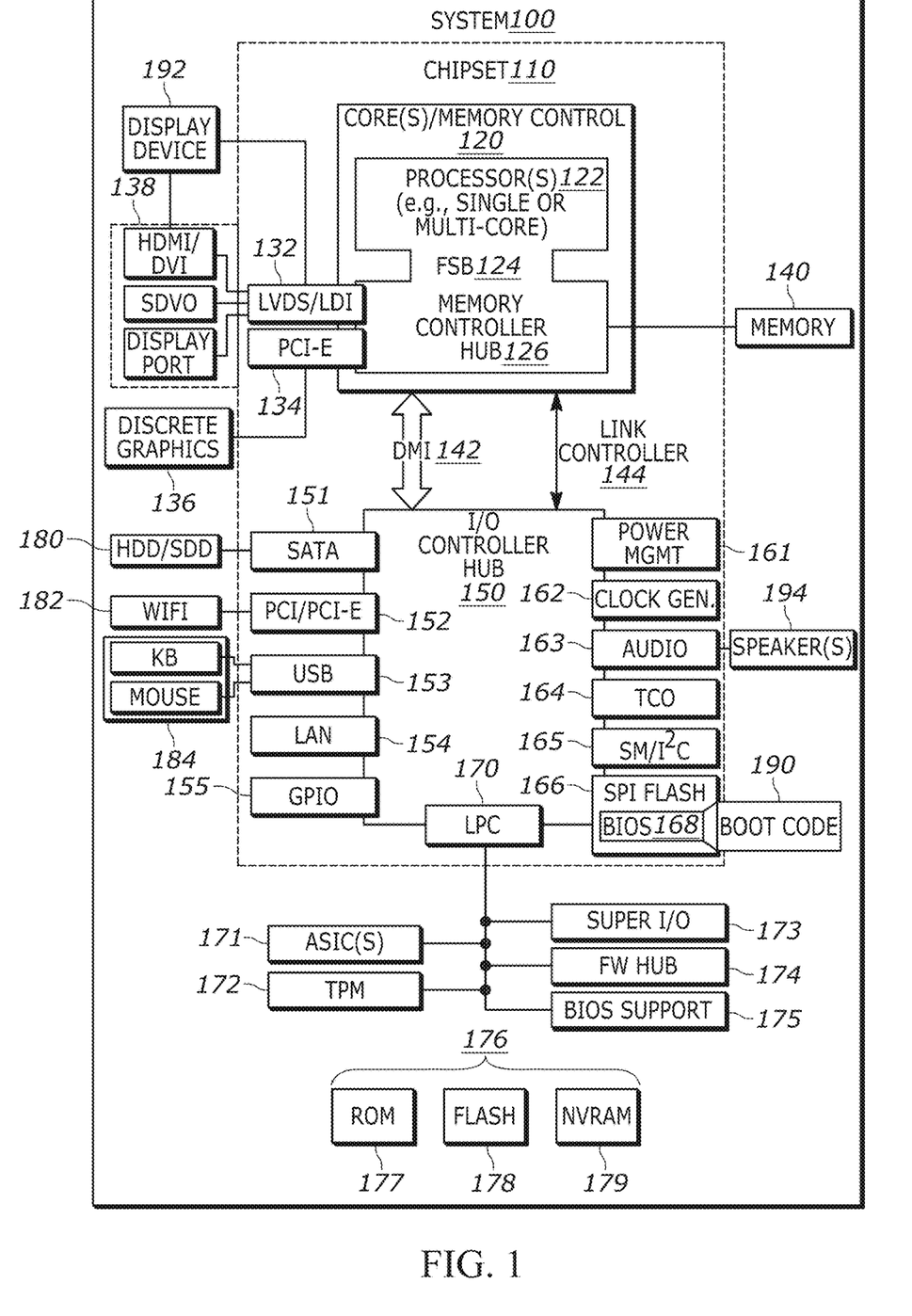
FIG. 1 is a block diagram of an example system consistent with present principles.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, a Bluetooth network using Bluetooth 5.0 communication, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes basic input/output system (BIOS) 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, though not shown for simplicity, in some embodiments the system 100 may include a gyroscope that senses and/or measures the orientation of the system 100 and provides related input to the processor 122, as well as an accelerometer that senses acceleration and/or movement of the system 100 and provides related input to the processor 122.

Still further, the system 100 may include an audio receiver/microphone that provides input from the microphone to the processor 122 based on audio that is detected, such as via a user providing audible input to the microphone as part of a video conference as described herein. The system 100 may also include one or more cameras that gather one or more images and provide the images and related input to the processor 122. The camera may be a thermal imaging camera, an infrared (IR) camera, a red green blue (RGB) digital camera such as a webcam, a three-dimensional (3D) camera, and/or a camera otherwise integrated into the system 100 and controllable by the processor 122 to gather still images and/or video including for video conferencing as other purposes as described herein.

Also, the system 100 may include a global positioning system (GPS) transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
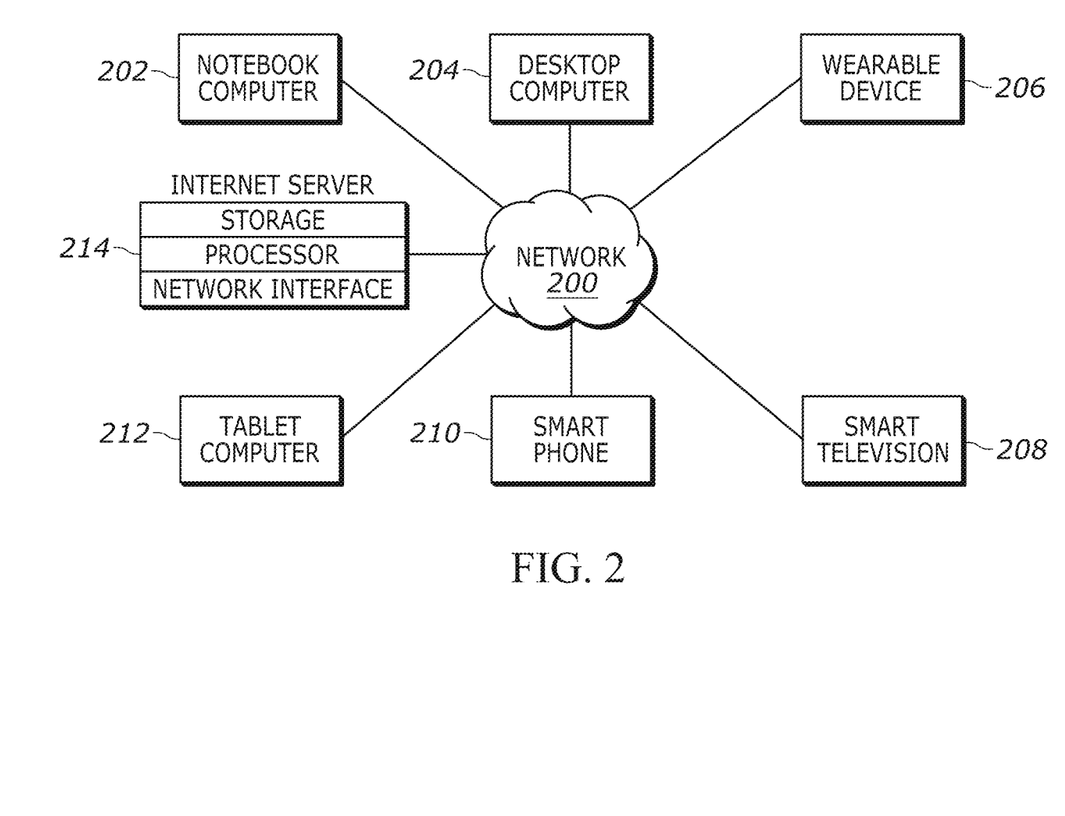
FIG. 2 is a block diagram of an example network of devices consistent with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 may be configured to communicate with each other over the network 200 to undertake present principles.

Figure 3:
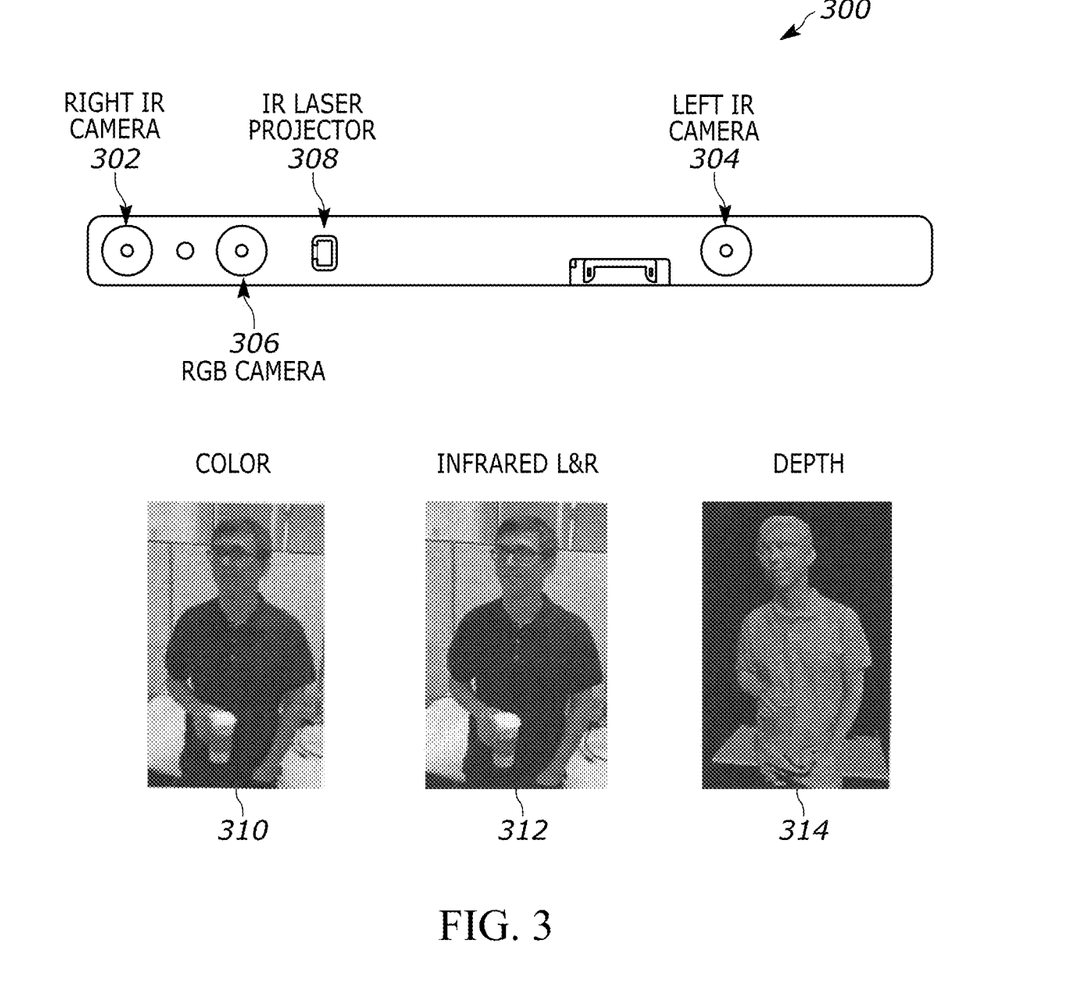
FIG. 3 is a schematic diagram of an example device and example image frames that may be used consistent with present principles.

FIG. 3 shows schematic diagram that includes a partial view of a front or other exterior surface of a device 300 such as the system 100, a smartphone, a laptop computer, or other device that may be configured to operate consistent with present principles. As shown, the device 300 may include a right infrared (IR) camera 302, a left IR camera 304, and a visible light/red green blue (RGB) camera 306. The device 300 may also include one or more IR laser projectors 308. The projector(s) 308 may include IR laser light emitters and/or IR light-emitting diodes (LED), and also possibly one or more IR photodiodes or additional IR cameras that may be controlled by the device 300 to sense IR light from the emitters/LEDs for IR depth sensing consistent with present principles.

For example, the device 300 may control the IR laser projector 308 to emit coherent IR laser light away from the device 300 at various angles, which may then be reflected off real-world objects in the environment and reflected back to the device 300 where it may be sensed by an IR photodiode establishing part of the projector 308 (or even sensed by one of the IR cameras 302, 304 if being used for depth sensing). The time-of-flight and/or detected intensity of the IR light reflections as sensed at the device 300 may then be used to determine the distance(s) between the device 300 and objects within the camera/sensor's field of view off which the IR light has reflected (and even different distances to different parts of a single object). For example, the device 300 may access a local or remotely-stored relational database that correlates respective IR light times of flight and/or intensities with respective distances. Thus, in using IR light, depth sensing may be performed without the light being visible and distracting to a local user while video conferencing or participating in another activity using live video from the RGB camera 306.

However, further note that radar transceivers and/or sonar/ultrasound transceivers and associated algorithms may also be used for depth sensing consistent with present principles. Still other types of depth sensors may also be used, such as other types of time-of-flight laser rangefinders (including those that might use visible or ultraviolet (UV light) laser light), light detection and ranging (Lidar) systems, and/or other proximity sensors.

The schematic view of FIG. 3 also shows three respective image frames 310, 312, and 314 that were all generated at a particular same time of day, or at least within a threshold number of milliseconds of each other so that each image frame 310-314 more or less captures a same scene at a certain particular time of day. The image frame 310 may be a RGB color image generated by the RGB camera 306. The image frame 312 may show IR light in the same environment and be generated by one or both of the cameras 302, 304 based on ambient IR light that is sensed from the environment (though in some examples the image frame 310 may also show IR light emitted by the projector 308 as also described herein). Thus, in some examples the frame 312 may be generated based on ambient IR light sensed by both of the cameras 302, 304, where a photo-editing application may then be used to rectify and merge each separate IR image from a respective camera 302, 304 to render the frame 312.

Regarding the depth image frame 314, it may be provided by a camera or other sensor establishing part of the projector 308 (or provided by one of the IR cameras 302, 304 if used for depth sensing while the other one of the cameras 302, 304 is used for generating the frame 312). Thus, if an IR camera were used for depth sensing, the output from that camera may establish the frame 314 based on sensed IR light that was emitted by the device 300. However, if the IR camera or another type of depth sensor were used to output a different type of distance data or even raw distance data, a matrix of multiple distance readings (e.g., occurring within milliseconds of each other) over the camera/sensor's field of view may be generated and then mapped to visual space to render the frame 314.

In any case, it may be appreciated in relation to FIG. 3 that the image frames 310-314 show/indicate the same person from more or less the same field of view, as generated at the same time of day while the person strikes a certain pose as shown.

Figure 4:
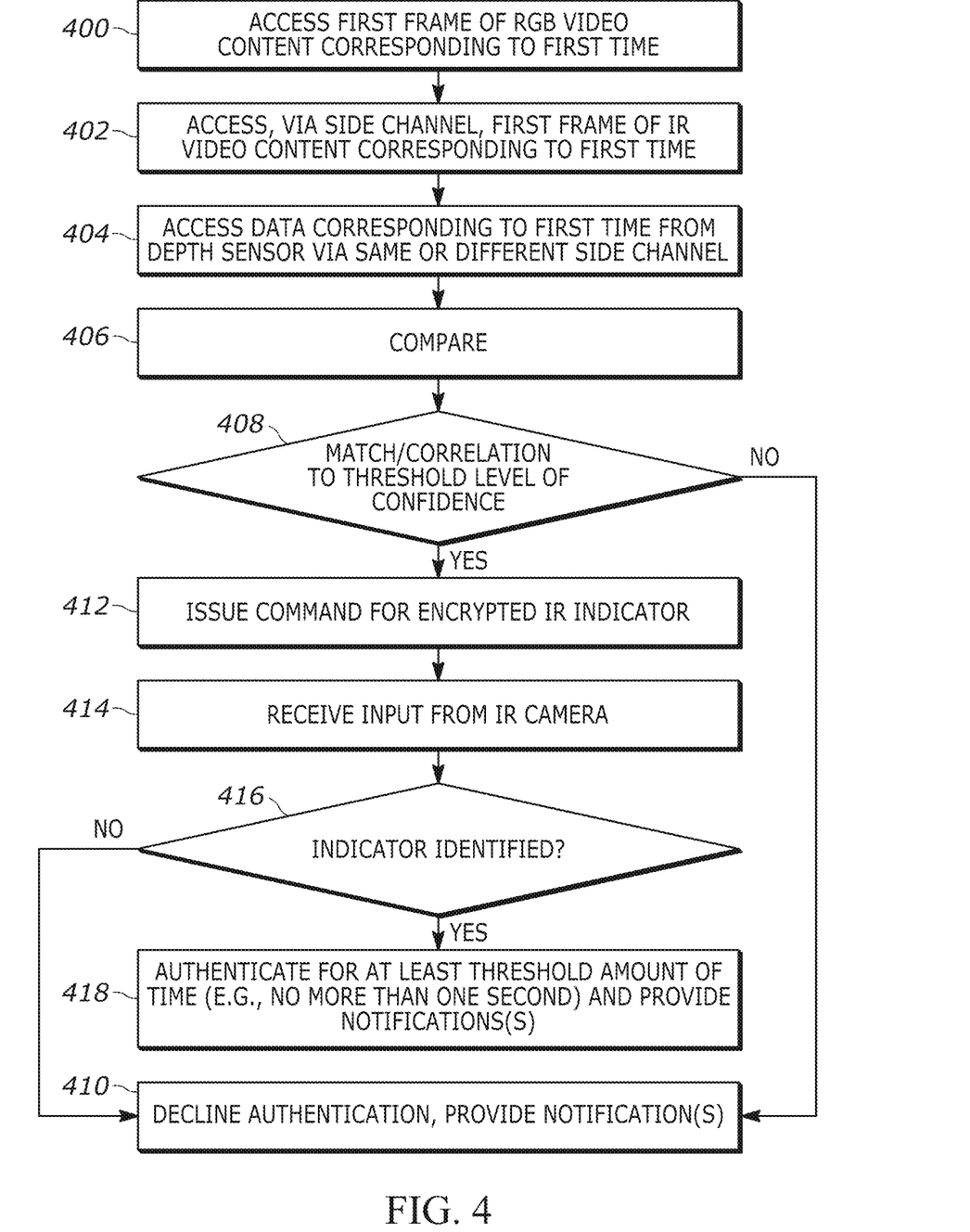
FIG. 4 illustrates example logic in example flow chart format consistent with present principles.

Referring now to FIG. 4, it shows example logic that may be executed by a device such as the system 100 to access and use a set of image frames provided by another device such as the device 300 that were generated at a same time of day or at least within a threshold time of each other consistent with present principles (e.g., the frames 310-314). For example, the logic of FIG. 4 may be executed by a server that is facilitating a video conference among respective client devices of end-users such as smartphones and laptop computers. Additionally or alternatively, the logic of FIG. 4 may be executed in whole or in part by one of the client devices themselves in any appropriate combination.

Beginning at block 400, the device may access a first frame of red green blue (RGB) video content that corresponds to a first time and shows/indicates a remotely-located video conference participant. The logic may then proceed to block 402 where the device may access a first frame of infrared (IR) video content also corresponding to the same first time. Thereafter the logic may proceed to block 404 where the device may access a depth image frame or other data from a depth sensor that also corresponds to the first time. In some examples, the first time itself may be a first time of day measured down to the second, so that the frames accessed at blocks 400-402 may correspond to that time even if generated within a threshold number of milliseconds of each other (e.g., if not generated at precisely the same time of day down to the millisecond as may also be done).

In any case, note at this point in the logic that the device executing it—whether a server or client device—may be remotely-located from another device on which the RGB camera, IR camera, and depth sensor are disposed that generated the frames/data of blocks 400-402. For example, the server or client device may be spaced from the other device by a few miles or more. Thus, the device executing the logic of FIG. 4 may stream the frames/data of blocks 400-402 from the other device to access them and attempt to use them to authenticate the other device's RGB video stream as described further below.

Accordingly, the RGB video stream (that may include the image frame accessed at block 400) may be received over the Internet or another network using a primary video conference channel that may be maintained by the provider of the video conference's software. The data accessed at blocks 402 and 404 may also be received over the same channel. However, note that in some examples to further increase security, when attempting to authenticate the RGB video stream (e.g., to determine that the RGB video stream is not a deep-fake), the device of FIG. 4 may access/receive the first frame of the IR video content and the data from the depth sensor at blocks 402 and 404 over a side channel instead. The side channel may use a different network, for example, such as using a cellular network at the same time the RGB video content and audio data for the video conference are being streamed from the other device using a LAN, local Wi-Fi network, etc. Additionally or alternatively, the side channel may be established by network communication outside of the video conferencing service itself so that, for example, the RGB video content may be accessed/received using an application provided by the video conference provider for conducting the video conference itself while the data accessed at blocks 402 and 404 may be received through a separate application or communications link not controlled or provided by the video conference provider. Still further, the side channel may use a different port on the server being used to host the video conference than a port through which the audio and RGB video data for the video conference is communicated. The side channel may also use a separate web portal or network portal for which username and password sign-in must be used to gain access.

To further increase security, also note that different side channels according to the above may be used for receiving the IR image frame at block 402 and the data from the depth sensor at block 404.

Thus, security may be heightened by using one or more side channels since a device seeking to perpetuate a deep-fake attack on the video conference would have to infiltrate at least two different channels and control them simultaneously to fake RGB image frames, IR image frames, and depth sensor data to even attempt the deep-fake attack. Security may be heightened even more by using different side channels for accessing the IR frame(s) at block 402 and depth sensor data at block 404 for the same reason. Thus, should deep fake technology be used not just to attempt to inject fictional RGB frames into the RGB video content (and inject fictional audio into the video conference's audio stream) but to also inject fictional IR frames and fictional depth data respectively into the IR video content stream and depth data stream, this effort would be significantly complicated by having to do so across two or even three different channels.

Still in reference to FIG. 4, from block 404 the logic may then proceed to block 406 where the device may compare the first frame of the RGB video content received at block 400 to either or both of the first frame of IR video content received at block 402 and depth sensor data received at block 404. The comparison may be performed to determine, at decision diamond 408, whether a match or correlation can be identified at least to within a threshold level of confidence. The threshold level of confidence may be set relatively high to ensure that the otherwise computationally-rigorous task of trying to deep-fake some or all of the data accessed at blocks 400-404 cannot be shortcut and therefore easier to perform. To this end, the threshold level of confidence may be set to at least ninety percent or above.

Additionally, while in some examples a match or correlation to within the threshold level of confidence may be sufficient between either of the first image of the RGB video content and the first image of the IR video content, or between the first image of the RGB video content and the data from the depth sensor, to further increase security a match or correlation to within the threshold level of confidence between all three may be used to further increase the computational complexity of any deep-fake effort that might be attempted.

Accordingly, as indicated above from block 406 the logic may proceed to decision diamond 408 where, based on the comparison at block 406, the device may determine whether a match or correlation to within the threshold level of confidence has in fact been identified. The match itself may relate to the matching of one or more boundaries or features of an object recognized from each image frame and/or depth sensor data that corresponds to the first time. To this end, object recognition along with boundary detection and feature extraction may be used.

Thus, for example, the face of the person or a specific part of the face as indicated in the image frames 310-314 of FIG. 3 may establish the object to be matched to result in an affirmative determination at diamond 408. E.g., a specific facial feature or combination of facial features may be identified. For example, the device may identify a same nose shape in all three frames 310-314 for an affirmative determination, or identify both a same nose shape and identify a same eye shape for one or both eyes for an affirmative determination, or identify a combination of a same nose shape, same eye shape, and same mouth shape for an affirmative determination for further security.

Or to also further increase security, multiple different objects or features recognized from the RGB image frame may be required to be matched to the IR image and/or depth sensor data for an affirmative determination at diamond 408. For example, the face of the person as well as a desk or lamp also shown in the RGB image frame may be required to be matched to the IR image and/or depth sensor data for an affirmative determination.

Or to increase security even further, in some examples every feature, boundary, and/or individual object shown in the RGB image frame 310 may be required to be matched to a corresponding feature, boundary, or object identified from one or both of the frames 312, 314 for an affirmative determination at diamond 408. This might include matching both all foreground and all background boundaries, features, and/or objects.

Still in reference to diamond 408, note that responsive to a negative determination the logic may proceed to block 410. At block 410 the device may decline to authenticate the RGB video content that is being streamed from the remotely-located device as part of the video conference, and/or decline to authenticate the video conference entirely. Also at block 410, the device may provide one or more notifications that authentication of the RGB video content has failed, such as by controlling a local display or the remotely-located displays of the client devices being used for the video conference to indicate that authentication has failed. One such example notification will be discussed later in reference to FIG. 6.

However, still in reference to FIG. 4, note that responsive to an affirmative determination at block 408, the logic may instead proceed to block 412. It is to be understood that steps 412-416 may be executed in some examples to further increase security and further circumvent deep-fake infiltration of the video conference. Thus, these steps involve, first at block 412, issuing a command to the other, remotely-located device from which the RGB video content is being provided to actuate its local IR LED, IR laser emitter, or other IR light projector to project an indicator (e.g. a particular random and/or encrypted pattern) in the IR light spectrum into the environment in which the remotely-located device is disposed. For example, the indicator may be projected onto a particular object identified by the device of FIG. 4 as being within the environment (e.g., onto the face of the person shown in the image frames 310-314). To further increase security, this command might be provided through the side channel described above rather than through whatever channel or network is being used for the video conference itself so that an unauthorized deep fake device that has infiltrated the video conference's server or the conference itself may not intercept or even know about the command to attempt to spoof an IR image frame to fraudulently show the indicator.

Then at block 414 the device executing the logic of FIG. 4 may access or receive, from the remotely-located device, one or more IR image frames from one or more IR cameras on the remotely-located device. Thereafter, at decision diamond 416 the device of FIG. 4 may determine whether the indicator can be identified from the IR image frame(s) received at block 414. In some examples, the IR image frame used for the determination at diamond 416 may be the same IR image frame corresponding to the first time that was accessed at block 402. However, in other examples the IR image frame may be different. Or the device of FIG. 4 may even require that the indicator be shown in a threshold number of consecutive IR image frames generated over time rather than a single IR image frame to further increase the complexity of trying to deep-fake the indicator in real time.

In any case, responsive to a negative determination at diamond 416, the logic may proceed to block 410 where, as described above, the device may decline to authenticate the RGB video content and/or may provide a notification of such. However, responsive to an affirmative determination at diamond 416, the logic may instead proceed to block 418.

Note again at this point that the indicator may be encrypted as projected into the remote environment. For example, symmetrical or asymmetrical encryption may be used to encrypt the word "authentic" or "real" into an encryption code that is then projected into the remote environment. Encryption of the indicator, or even use of a seemingly-random but unencrypted indicator (such as a string of numbers or random two-dimensional geometrical shape), may therefore be used so that the indicator's pattern may not be readily appreciated by an unauthorized user/device as having any relevance even if the unauthorized user/device were to gain access to the authentic IR image frame showing the indicator or the initial indicator command itself. Not appreciating the relevance may in turn cause the unauthorized user/device to disregard the indicator if attempting to generate a deep fake IR image frame version showing other features from the authentic IR image frame. But the indicator may still denote to the device of FIG. 4, which knows to look for the indicator (e.g., in encrypted form or even to look for the word "authentic" or "real" after decrypting), that the IR image frame having the indicator is in fact authentic and not a deep fake.

Thus, at block 418 responsive to identifying the indicator (and responsive to determining at diamond 408 that a match has been identified at least to within the threshold level of confidence), the device executing the logic of FIG. 4 may authenticate the RGB video content or video conference as a whole. Also at block 418, the device may provide one or more notifications that the RGB video content has been authenticated, such as controlling a local display or the displays of the client devices being used for the video conference to indicate successful authentication. One such example notification will be discussed later in reference to FIG. 5.

However, first note in relation to block 418 that the RGB video content (or video conference itself) may in some examples only be authenticated for a first threshold amount of time that does not establish the entire duration of the video conference. For example, the first threshold amount of time may be one second or less to make real time spoofing of the indicator more computationally intensive should an unauthorized deep fake device somehow be made aware of it. Thus, after the first threshold amount of time, the logic may revert to block 400 and proceed again to attempt to re-authenticate the RGB video content.

Figure 5:
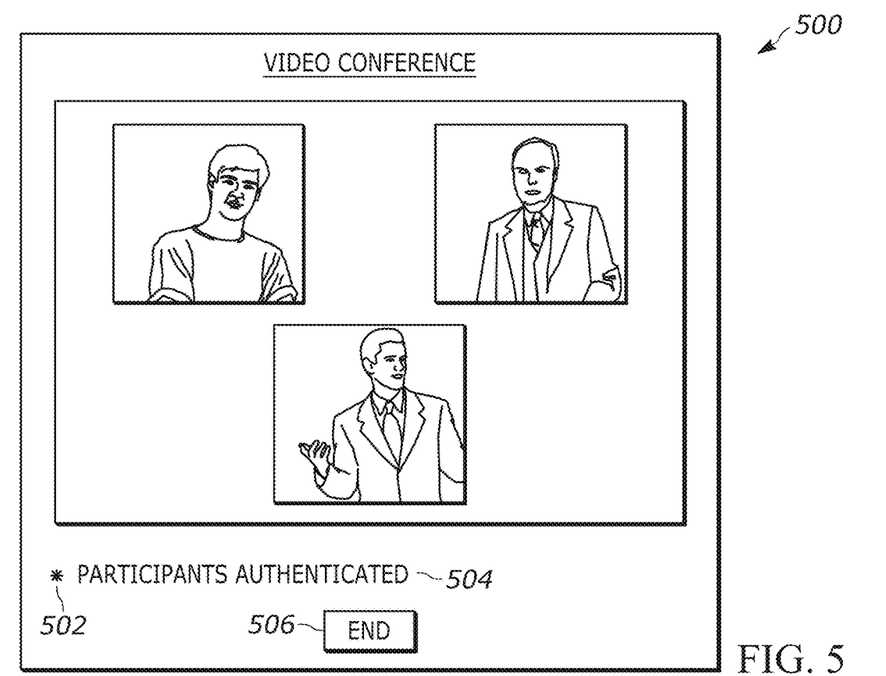
FIGS. 5 and 6 show example graphical user interfaces (GUIs) that may be presented on a display during video conferencing consistent with present principles.

Continuing the detailed description in reference to FIG. 5, it shows an example graphical user interface (GUI) 500 that may be presented at a first participant's personal device as part of a video conference with one or more remotely-located participants, such as the three remote participants shown in the respective real-time RGB video feeds presented on the GUI 500. Assume for FIG. 5 that the RGB video feed for each of those remotely-located participants has been authenticated as set forth above. Responsive to the authentications, the GUI 500 may present one or more notifications such as a non-text icon 502 that may be established by a star (as shown) or even a green-colored traffic light. The one or more notifications may also include text 504 indicating that the RGB video feeds of the remote participants have each been authenticated. In some examples, note that the GUI 500 may also include an end selector 506 that may be selectable to end or disconnect the local user's device from the video conference.

Figure 6:
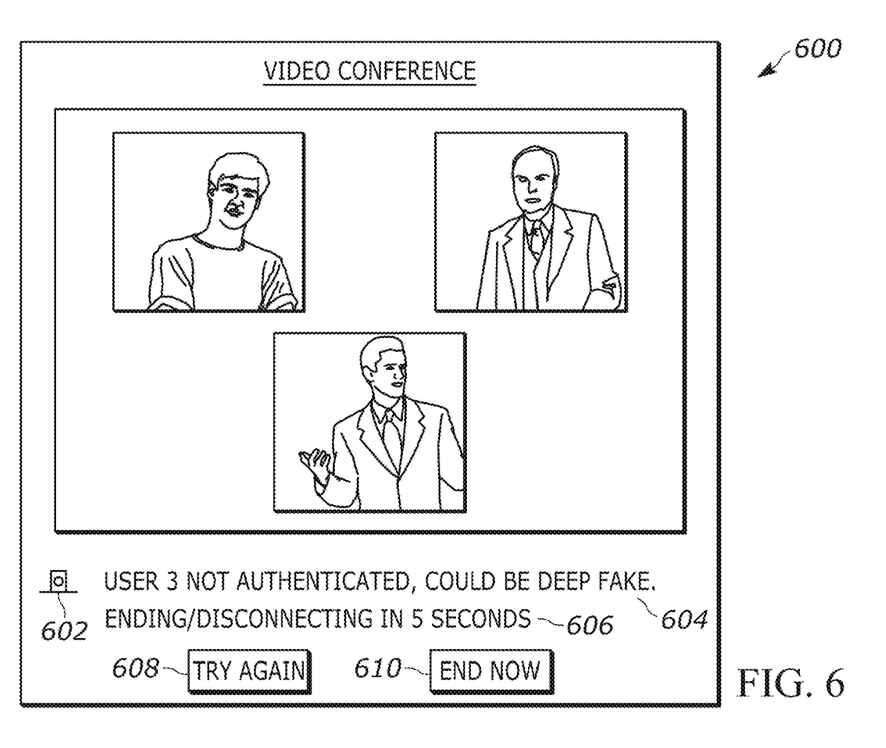

However, if according to the example above authentication failed for one or more of the RGB video feeds of the remote participants, the GUI 600 of FIG. 6 may be presented on the display of the local user's device instead of the GUI 500. Thus, as shown in FIG. 6, a different non-text icon 602 such as a red-colored traffic light and different text 604 may be presented as notifications that authentication has failed for the RGB video feed of one or more of the remote participants. The text 604 may also explicitly indicate that the RGB video feed for which authentication has failed may be a deep-fake video feed showing fictional actions by the respective participant rather than being an authentic video feed showing actual movements that the respective participant actually performed in real life. Though not shown, the text 604 may also identify the particular remote participant associated with the potentially fraudulent RGB video feed by username, actual first and last name, etc.

Additionally, if desired the GUI 600 may also include an indication 606 that, based on the authentication failing, the conference will end and/or the user's local device will disconnect from the conference within five seconds or another threshold period of time during which the same RGB video feed still cannot be authenticated. Thus, it is to be understood that authentication may be re-attempted during the five-second window to compensate for potential network errors or processing errors, but to still prevent deep-fake infiltration of the video conference if the RGB video feed still cannot be authenticated during that time.

Also if desired, the GUI 600 may also include a selector 608 that may be selectable by the local user to manually command the local device (or server in communication with it) to re-attempt authentication of the corresponding RGB video feed. Additionally, a selector 610 may be presented so that the user may select it to end the video conference or at least disconnect the local device from it after appreciating the notifications 602, 604.

Figure 7:
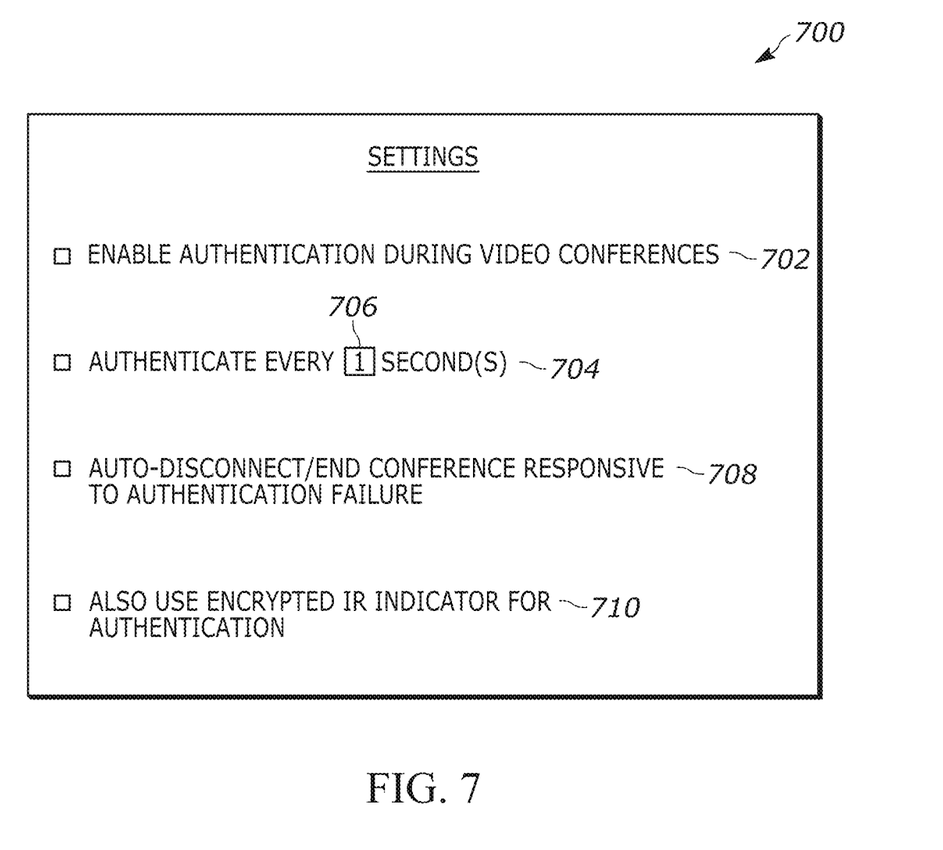
FIG. 7 shows an example GUI that may be presented on a display to configure one or more settings of a device to operate consistent with present principles.

Continuing the detailed description in reference to FIG. 7, it shows an example GUI 700 that may be presented on the display of a server or local client device configured to undertake present principles. The GUI 700 may be presented for configuring one or more settings of the device to operate consistent with present principles, and it is to be understood that each option to be discussed below may be selected by directing touch or cursor input to the respectively adjacent check box.

Beginning first with the option 702, it may be selected to set or enable the device to undertake present principles in the future. For example, the option 702 may be selected a single time to set or configure the device to execute the logic of FIG. 4 as well as to present the GUIs shown in FIGS. 5 and 6 for one or even possibly multiple future video conferences.

The GUI 700 may also include a setting 704 at which an end-user or system administrator can establish the first threshold amount of time described above in reference to block 418 that relates to how often the device should attempt authentication of an RGB video feed from a remotely-located RGB video camera. In the present example, this threshold amount of time has been set to one second by the user by directing numerical input to input box 706.

As also shown in FIG. 7, the GUI 700 may include an option 708 that may be selected to set or configure the device to automatically (and possibly immediately) disconnect from or end a video conference responsive to a failure to authenticate one of its RGB video streams to thus prevent deep-faking and its after-effects without the device first re-attempting authentication during the five-second or other window described above in reference to FIG. 6.

Additionally, the GUI 700 may include an option 710 that may be selectable to command the device to specifically use a (possibly encrypted) IR indicator during authentication for added security. For example, selection of the option 710 may set or configure the device to specifically execute blocks 412 and 414 and make the determination of diamond 416 of FIG. 4.

It may now be appreciated that present principles provide for an improved computer-based user interface that increases the functionality and ease of use of the devices disclosed herein and helps circumvent the computer-specific process of deep-faking. The disclosed concepts are thus rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A first device, comprising:
at least one processor; and
storage accessible to the at least one processor and comprising instructions executable by the at least one processor to:
access a first frame of red green blue (RGB) video content, the first frame of the RGB video content corresponding to a first time;
access a first frame of infrared (IR) video content, the first frame of the IR video content corresponding to the first time;
access data from a depth sensor, the data corresponding to the first time;
compare the first frame of the RGB video content to one or more of the first frame of the IR video content and the data from the depth sensor to determine whether a match can be identified at least to within a threshold level of confidence; and
responsive to a determination that a match has been identified at least to within the threshold level of confidence, authenticate the RGB video content for at least a first amount of time and indicate the RGB video content as being authenticated via a graphical user interface (GUI) presented on a display.

2. The first device of claim 1, wherein the instructions are executable to:
access the first frame of the IR video content and the data from the depth sensor via a side channel different from another channel through which the RGB video content is being communicated to the first device.

3. The first device of claim 1, wherein the instructions are executable to:

compare the first frame of the RGB video content at least to the first frame of the IR video content to determine whether a match can be identified at least to within the threshold level of confidence; and
responsive to a determination that a match has been identified at least to within the threshold level of confidence at least using the first frame of the RGB video content and the first frame of the IR video content, authenticate the RGB video content for at least the first amount of time and indicate the RGB video content as being authenticated via the GUI presented on the display.

4. The first device of claim 1, wherein the instructions are executable to:
compare the first frame of the RGB video content at least to the data from the depth sensor to determine whether a match can be identified at least to within the threshold level of confidence using the first frame of the RGB video content and the data from the depth sensor; and
responsive to a determination that a match has been identified at least to within the threshold level of confidence at least using the first frame of the RGB video content and the data from the depth sensor, authenticate the RGB video content for at least the first amount of time and indicate the RGB video content as being authenticated via the GUI presented on the display.

5. The first device of claim 1, wherein the instructions are executable to:
compare the first frame of the RGB video content to both the first image of the IR video content and the data from the depth sensor to determine whether a match can be identified at least to within the threshold level of confidence using the first frame of the RGB video content, the first frame of the IR video content, and the data from the depth sensor; and
responsive to a determination that a match has been identified at least to within the threshold level of confidence at least using the first frame of the RGB video content, the first frame of the IR video content, and the data from the depth sensor, authenticate the RGB video content for at least the first amount of time and indicate the RGB video content as being authenticated via the GUI presented on the display.

6. The first device of claim 1, wherein the match relates to the matching of one or more boundaries indicated in the first images and data.

7. The first device of claim 1, wherein the match relates to matching features of the face of a person indicated in the first frame of the RGB video content and indicated in one or more of: the data from the depth sensor, the first frame of the IR video content.

8. The first device of claim 1, wherein the first amount of time is no more than one second.

9. The first device of claim 1, wherein the threshold level of confidence is at least ninety percent or above.

10. The first device of claim 1, wherein the depth sensor comprises a time-of-flight depth sensor selected from the group consisting of: a laser rangefinder, an IR rangefinder.

11. The first device of claim 10, comprising the depth sensor and comprising an IR camera that generates the IR video content.

12. The first device of claim 1, wherein the first device comprises a server that facilitates a video conference, wherein the RGB video content indicates a participant of the video conference, and wherein the server receives, from a second device different from the first device, the first frame of the RGB video content, the first frame of the IR video content, and the data from the depth sensor.

13. A computer-implemented method, comprising:
accessing, at a first device, a first frame of red green blue (RGB) video content, the first frame of the RGB video content corresponding to a first time;
accessing, at the first device, a first frame of infrared (IR) video content, the first frame of the IR video content corresponding to the first time;
accessing, at the first device, data from a depth sensor, the data corresponding to the first time;
determining, using the first device, whether a match can be identified at least to within a threshold level of confidence based on the first frame of the RGB video content and one or more of: the first frame of the IR video content, the data from the depth sensor;
responsive to determining that a match has been identified at least to within the threshold level of confidence, using the first device to authenticate the RGB video content for at least a first amount of time; and
indicating, using the first device, the RGB video content as being authenticated via a graphical user interface (GUI).

14. The method of claim 13, comprising:
prior to authenticating the RGB video content, identifying an indicator in at least one IR image frame; and
responsive to identifying the indicator and responsive to determining that a match has been identified at least to within the threshold level of confidence, using the first device to authenticate the RGB video content for at least the first amount of time.

15. The method of claim 14, wherein the indicator is encrypted, and wherein the indicator denotes that the IR image frame is not fake.

16. At least one computer readable storage medium (CRSM) that is not a transitory signal, the computer readable storage medium comprising instructions executable by at least one processor to:
access a first frame of red green blue (RGB) video content, the first frame of the RGB video content corresponding to a first time;
access a first frame of infrared (IR) video content, the first frame of the IR video content corresponding to the first time;
access data from a depth sensor, the data corresponding to the first time;
determine whether at least a portion of the first frame of the RGB video content correlates, at least within a threshold level of confidence, to at least a portion of one or more of the first frame of the IR video content and the data from the depth sensor; and
authenticate the RGB video content and indicate the RGB video content as being authenticated via a graphical user interface (GUI) presented on a display, the RGB video content being authenticated responsive to a determination that at least a portion of the first frame of the RGB video content correlates, at least within the threshold level of confidence, to at least a portion of one or more of the first frame of the IR video content and the data from the depth sensor.

17. The CRSM of claim 16, wherein the instructions are executable to:
prior to authenticating the RGB video content, identify an indicator in at least one IR image frame, the indicator denoting that the IR image frame is not a deep fake; and
responsive to identifying the indicator, authenticate the RGB video content.

18. The first device of claim 1, wherein the instructions are executable to:
present the GUI on the display, the GUI comprising a non-text icon and text indicating that the RGB video content has been authenticated.

19. The method of claim 13, comprising:
presenting the GUI on a display, the GUI comprising at least one graphical element indicating that the RGB video content has been authenticated.

20. The CRSM of claim 16, wherein the instructions are executable to:
present the GUI on the display, the GUI comprising at least one graphical element indicating that the RGB video content has been authenticated.

* * * * *